(No Model.)
O. ASCHE.
MACHINE FOR SOLDERING TIN CANS.
No. 575,582. Patented Jan. 19, 1897.
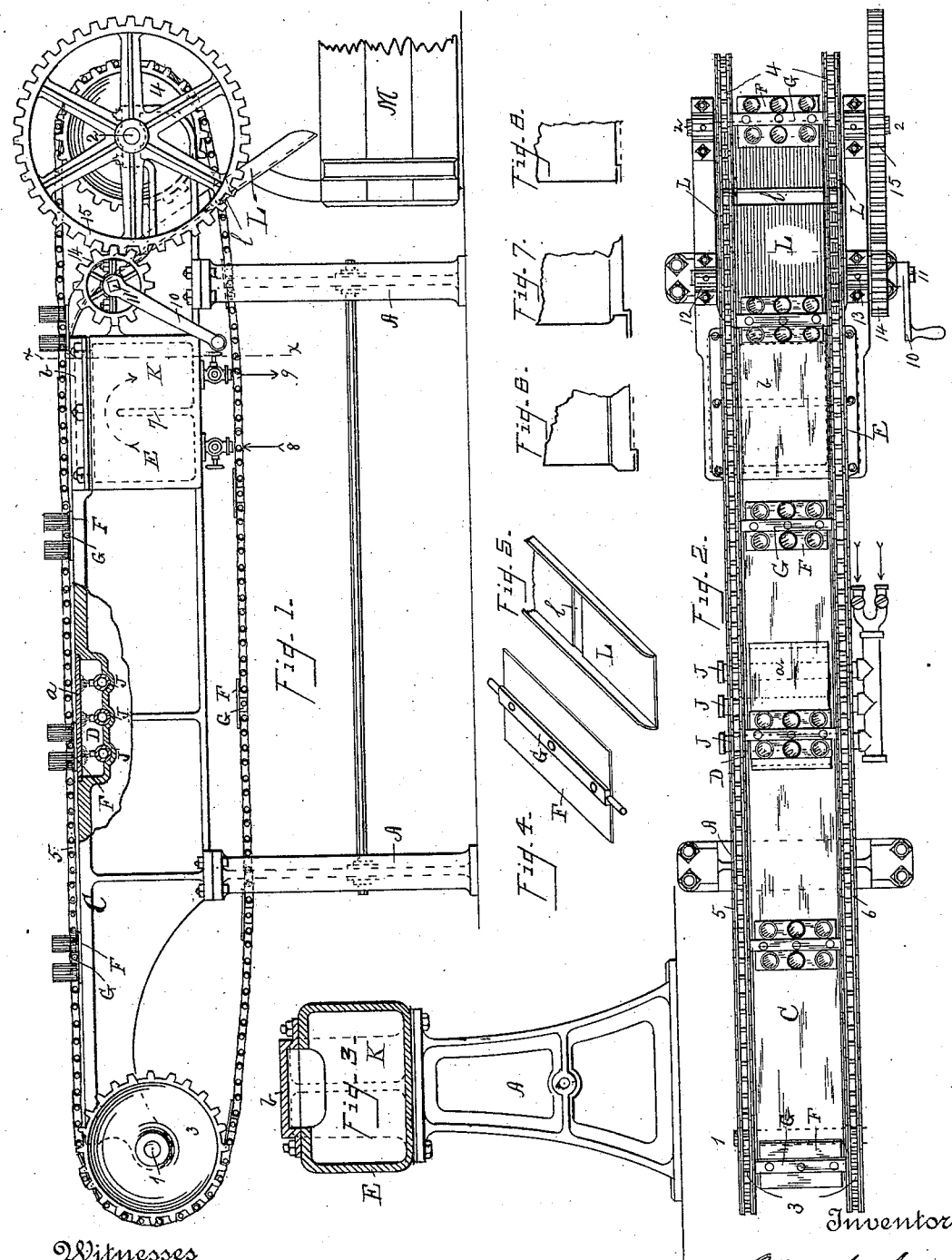
Witnesses
H. N. Jenkins
F. H. Wetmore
Inventor
Otto Asche
by G. Dittman,
Attorney

UNITED STATES PATENT OFFICE.

OTTO ASCHE, OF PARIS, FRANCE.

MACHINE FOR SOLDERING TIN CANS.

SPECIFICATION forming part of Letters Patent No. 575,582, dated January 19, 1897.

Application filed September 18, 1894. Serial No. 523,409. (No model.)

*To all whom it may concern:*

Be it known that I, OTTO ASCHE, a citizen of the Republic of France, residing at the city of Paris, France, have invented a new and useful Machine for Soldering Tin Cans, of which the following is a specification.

The present invention relates to machines for soldering tin cans and other tin receptacles for containing eatables, such as are usually put up in hermetically-sealed packages, and has for its object to provide a machine for carrying out the soldering process in three operations, as follows: In the first operation the edge or both edges of the body of the can are provided with the solder, either by dipping the rim or rims into a liquid-tin bath or by applying the solder in the form of strips or wires; second, the rim thus provided with solder is applied to its head, and the parts are made to travel over a source of heat where the solder is molten in such manner that the parts are in no way exposed to friction or liable to displacement; third, the molten solder is then quickly cooled, and thus the operation is completed.

While undergoing the aforesaid treatment, the cans are guided over plates of suitable temperatures, as hereinafter fully described.

To this end my invention consists in the improved construction, arrangement, and combination of parts hereinafter fully described, and afterward specifically pointed out in the appended claims.

The accompanying drawings contain views of an apparatus through the instrumentality of which the process is accomplished.

Figure 1 is a side elevation of the machine with certain parts broken away and with the nearest drive-chain omitted; Fig. 2, a plan or top view thereof, and Fig. 3 a cross-section on line $x\,x$ of Fig. 1. Fig. 4 is a perspective view of one of the carriages on which the cans are conveyed during the soldering process, and Fig. 5 a perspective view of the discharge-chute of the machine. Figs. 6, 7, and 8 represent forms in which the metal of the cans may be bent so as to present soldering edges. These forms may of course be varied to suit the operator or trade demand.

A table supported by frames A A is composed of three parts C, D, and E. The top of part C consists of a flat plate of ordinary temperature. The part D is provided with an upper plate $a$, which is designed to be heated, as hereinafter described, and the part E has a top plate $b$ and means for keeping same in a cool condition.

The ends of the machine are provided with suitable bearings for receiving the journals of horizontal cross-shafts 1 2, carrying chain-wheels 3 4, over which operates the chain 5 6, to which carriages F, made of thin plates of metal, are connected by cross-bars G, so that the said carriages may be adapted to slide along the top of the tables in order to be exposed to the different temperatures of the same, and thus to convey the cans placed upon said carriages over the different plates during the soldering process to a chute L, into which they are discharged by hand or otherwise and thus conveyed to a receiving-box M. It is preferable to make the carriages F of aluminium or other metal with which solder will not easily combine.

The carriages are connected with the drive-chains at a sufficient distance apart to permit of a free movement of the same around the ends of the machine, as well as to afford ample room for the discharge of the finished cans into the chute and box below same. The chute L, being of necessity arranged in the line of travel of the lower part of the drive-chains and carriages, is provided with a transverse opening $l$ of sufficient width and height to permit of a free passage of the said chains and carriages, or, if preferred, the chute may be made in two parts with space between same for the aforesaid purpose. In such case the upper part of the chute should be connected with the machine-frame and the lower part with the receiving-box, as shown in Fig. 1.

The plate D is designed to be heated by means of gas supplied through burners J J J, which are arranged below said plate, as shown in Figs. 1 and 2.

Other heating means may be employed, but care should be taken that the temperature appropriate to the soldering can be obtained and maintained thereby.

Below the plate $b$ of part E is a water-reservoir K, which is preferably provided with a central wall or partition 7, extending nearly to the top thereof, so as to form two compartments, one of which shall constantly be receiving through valve 8 a supply of cool water, which flowing over the central partition 7 absorbs the heat of plate b and passes off with same into the second compartment, from whence it is discharged through a pipe and valve, as indicated at 9, or in any other convenient manner.

Steam or other power may be employed for operating the machine; but in the drawings it is shown as being adapted to be worked by hand through a crank 10, fixed to the end of a shaft 11, which is journaled in the sides of the frame, as shown at 12 13, the said shaft being provided with a pinion 14, which engages the teeth of a larger wheel 15 on the chain-wheel shaft 2.

The operation of the machine in soldering cans automatically is as follows: The carriages F are successively brought into position over part C of the table by setting the machine in motion, and their surfaces are then covered with can-bottoms, on which the can-bodies with previously-prepared soldered rims are arranged. Weights in form of heavy flat iron plates or of any other shape may be placed by the attendant on each can to more fully insure the contact of the edge of the can-body with the bottom. The apparatus in continuing its motion brings each carriage-load over the heated plate a of part D, the solder is melted, and the bottoms and bodies of the different cans are thus united. Further movement of the apparatus brings the carriages over cold plate b of part E, which quickly hardens the solder and thus finishes the process.

It will be readily understood that the cans in traveling, as described, with the carriages are in no way exposed to displacement even when not held by weights, and that by reason of the heat passing through the thin plates of the carriage the solder will be melted and thus form a perfectly tight joint.

When the carriages reach the chute L, the cans are swept therefrom, either by hand or other means, into the chute and the receiving-box arranged below same.

Having described my invention, what I claim as new, and desire to secure by Letters Patent, is—

1. In an apparatus for soldering tin cans, the combination of a heat-conducting support for the cans, a heated surface, a cooling surface, and means substantially as described for moving the can-support over said surfaces consecutively, substantially as and for the purpose set forth.

2. In an apparatus for soldering tin cans, the combination of a heater, a cooler, a can-support, consisting of thin plates of heat-conducting material, and means substantially as described whereby the can-support is moved over the heater and cooler in the order named and for the purpose set forth.

3. In a can-soldering machine, the combination of a heated slab, a cooled slab, a thin sheet of heat-conducting material supporting the can, and means whereby the said heat-conducting can-support is first superposed upon the heated slab and afterward upon the cooled slab, whereby the heat from the slabs is conducted through the support to first melt and afterward solidify the solder of the can, substantially as set forth.

4. A can-soldering machine embodying in its construction a thin sheet of heat-conducting material on which the can is to be placed and held by any suitable means or pressure, the said sheet supporting and separating the can from two slabs placed one in advance of the other, one slab to be heated and the other to be cooled by any suitable means and means for carrying said sheet and the can over said slabs in the order named, these parts being combined substantially as described whereby the heat from the hot slab is conducted through the sheet to melt the solder of the can and the cold slab acts to solidify said solder when the sheet and can are passing over it, all as set forth.

5. The combination in an apparatus for soldering tin cans, of a table provided with three parts, each part having a flat top, the second and third parts, provided, respectively, with means substantially as described, for heating and cooling the same, with carriages of flat thin metal secured to endless chains, and means for operating the chains so that carriage-loads of cans shall be conveyed along the top of the table, and the cans of the different loads successively soldered, substantially as set forth.

In testimony whereof I have signed my name to this specification in the presence of two subscribing witnesses.

OTTO ASCHE.

Witnesses:
C. MARCHE,
C. GRIMBERT.